(12) United States Patent
Lent et al.

(10) Patent No.: US 8,996,455 B2
(45) Date of Patent: Mar. 31, 2015

(54) SYSTEM AND METHOD FOR CONFIGURING A STORAGE NETWORK UTILIZING A MULTI-PROTOCOL STORAGE APPLIANCE

(75) Inventors: Arthur F. Lent, Cambridge, MA (US); Brett P. Cooper, Raleigh, NC (US)

(73) Assignee: NetApp, Inc., Sunnyvale, CA (US)

( * ) Notice: Subject to any disclaimer, the term of this patent is extended or adjusted under 35 U.S.C. 154(b) by 690 days.

(21) Appl. No.: 10/835,987

(22) Filed: Apr. 30, 2004

(65) Prior Publication Data

US 2005/0246345 A1    Nov. 3, 2005

(51) Int. Cl.
*G06F 17/30*    (2006.01)
*H04L 29/08*    (2006.01)

(52) U.S. Cl.
CPC ..................... *H04L 29/08* (2013.01)
USPC ............... 707/610; 707/620; 707/634

(58) Field of Classification Search
CPC ......................................... H04L 29/08
USPC ............ 707/101, 200, 610, 620, 634
See application file for complete search history.

(56) References Cited

U.S. PATENT DOCUMENTS

| | | | | |
|---|---|---|---|---|
| 5,109,515 | A * | 4/1992 | Laggis et al. ................. | 707/10 |
| 5,819,292 | A | 10/1998 | Hitz et al. | |
| 5,996,024 | A * | 11/1999 | Blumenau ..................... | 719/326 |
| 6,026,088 | A * | 2/2000 | Rostoker et al. ............. | 370/395.53 |
| 6,400,730 | B1 | 6/2002 | Latif et al. ..................... | 370/466 |
| 6,606,690 | B2 * | 8/2003 | Padovano ..................... | 711/148 |
| 6,628,965 | B1 * | 9/2003 | LaRosa et al. ................ | 455/557 |
| 6,721,859 | B1 * | 4/2004 | Smyers ......................... | 711/154 |
| 6,826,613 | B1 * | 11/2004 | Wang et al. ................... | 709/227 |
| 6,993,539 | B2 | 1/2006 | Federwisch | |
| 7,107,385 | B2 | 9/2006 | Rajan | |
| 7,185,062 | B2 * | 2/2007 | Lolayekar et al. ............ | 709/213 |
| 2002/0087716 | A1 * | 7/2002 | Mustafa ........................ | 709/236 |
| 2002/0116564 | A1 * | 8/2002 | Paul et al. ..................... | 710/301 |
| 2002/0120763 | A1 * | 8/2002 | Miloushev et al. .......... | 709/230 |
| 2003/0093541 | A1 * | 5/2003 | Lolayekar et al. ........... | 709/230 |
| 2003/0093567 | A1 * | 5/2003 | Lolayekar et al. ........... | 709/246 |
| 2003/0204580 | A1 | 10/2003 | Baldwin et al. | |
| 2003/0236945 | A1 * | 12/2003 | Nahum ......................... | 711/114 |
| 2003/0236988 | A1 * | 12/2003 | Snead .......................... | 713/193 |
| 2004/0030668 | A1 | 2/2004 | Pawlowshi et al. | |
| 2004/0233910 | A1 * | 11/2004 | Chen et al. .................. | 370/395.5 |

(Continued)

FOREIGN PATENT DOCUMENTS

WO    WO 02/069159 A1    9/2002

OTHER PUBLICATIONS

Yingping Lu et al "Performance Study of iSCSI-Based Storage Subsystems" IEEE Communications Magazine, Aug. 2003, University of Minnesota.

(Continued)

*Primary Examiner* — Etienne LeRoux
*Assistant Examiner* — Jared Bibbee
(74) *Attorney, Agent, or Firm* — Cesari and McKenna, LLP

(57) ABSTRACT

A system and method for configuring a storage network utilizing one or more storage appliances to utilize the multi-block based protocol nature of the storage appliances. By configuring the storage network, data served by the storage appliance may be accessed by a plurality of protocols simultaneously. Illustratively, a virtual disk (vdisk) may be access by clients using the FCP protocol over a FC network while other clients access the vdisk using the iSCSI protocol over a TCP/IP network.

20 Claims, 10 Drawing Sheets

(56) References Cited

U.S. PATENT DOCUMENTS

2006/0010265 A1* 1/2006 Aiken et al. .................... 710/33
2007/0069947 A1* 3/2007 Banet et al. .............. 342/357.09

OTHER PUBLICATIONS

International Search Report for PCT/US2005/013565, International Searching Authority, Jul. 25, 2005.
Maintenance Procedures ND (8C) nd-network disk control Feb. 1985.
Misc. Reference Manual Pages ND (4P) nd-network disk driver Jul. 26, 1985.
Asante EN/SC Adapter Family Installation Guide May 1994.
Asante Desktop EN/SC Adapters User's Manual Apr. 1996.
Performance Without Compromise: The Virtual Storage Architecture 1997.
Anthony J. McGregor Department of Computer Science, University of Waikato Dissertation: Block-Based Distributed File Systems Jul. 1997.

* cited by examiner

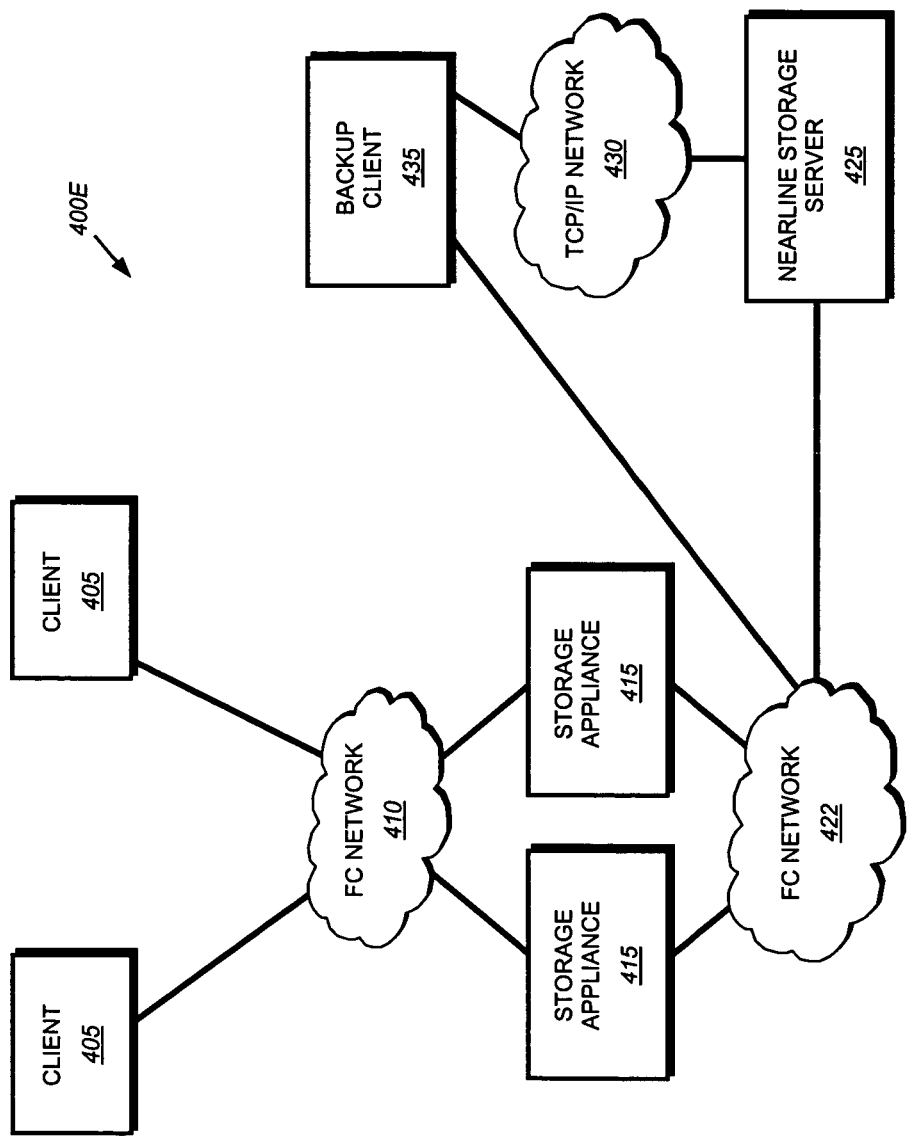

SYSTEM AND METHOD FOR CONFIGURING A STORAGE NETWORK UTILIZING A MULTI-PROTOCOL STORAGE APPLIANCE

FIELD OF THE INVENTION

The present invention relates to storage networks and, in particular, to configuring storage networks using a multi-protocol storage appliance capable of simultaneously exporting information using a plurality of block-based protocols.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI).

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the client requesting the information maintains file mappings and manages file semantics, while its requests (and server responses) address the information in terms of block addressing on disk using, e.g., a logical unit number (lun).

Previous SAN approaches permit the exporting of data using a single data transfer architecture, such as a conventional fibre channel (FC) networking standard. Data may then be transferred by clients in a SAN arrangement using a single block-based protocol such as a FCP over a FC network. To provide multi-pathing and/or data path redundancy, the SAN arrangement must have two separate physical networks associated with the desired protocol, e.g., a primary and redundant FC network. A noted disadvantage of such requirement is the high cost of implementing the FC network. Installing a second, redundant FC network for use in failure situations of the primary FC network imposes a high cost to installing and maintaining FC SAN arrangements. Additionally, all clients of the storage system must use the same block protocol.

An additional, noted disadvantage is that when a SAN environment is modified to change the protocol utilized, such as from FCP to iSCSI or vice versa, the entire network must be changed at the same time due to dissimilar cabling and associated hardware. This requirement may result in service disruption as all clients, cabling and intermediate node hardware must likewise be changed.

SUMMARY OF THE INVENTION

The present invention overcomes the disadvantages of the prior art by providing a system and method for configuring a storage network using a multi-protocol storage appliance that permits clients to access information via a plurality of protocols simultaneously. The multi-protocol storage appliance includes a virtualization system that permits a file system to logically organize the information as named file, directory and virtual disk (vdisk) storage objects. In the illustrative embodiment, the virtualization modules are embodied as, for example, a vdisk module and a small computer system's interface (SCSI) target module. The vdisk module provides a data path from the block-based SCSI target module to blocks managed by the file system. The SCSI target module initiates emulation of a disk or logical unit number (lun) by providing a mapping procedure that translates logical block access to luns specified in access requests into virtual block access to vdisks. The multi-protocol storage appliance permits a single vdisk to be exported utilizing both the FCP and iSCSI protocols simultaneously.

In a first embodiment of the present invention, clients of the storage appliance are connected to storage appliance via a FC network, which provides a high-speed data access path. The storage appliance is further connected to a nearline storage server, which provides backup and redundancy features, via a TCP/IP network. The storage appliance may export the same data, e.g., a vdisk, over both the FC network and TCP/IP network simultaneously. Thus, in the first embodiment the need to install dual FC networks for redundant data paths is obviated, thereby saving considerable expense.

In a second embodiment, a pair of clients arranged in a cluster configuration utilizes differing transport media for accessing one or more storage appliances. A first client utilizes FCP over a FC network to communicate with a storage appliance, while a second client utilizes a TCP/IP network and the iSCSI protocol to communicate with the storage appliance. The storage appliance may export the same information, for example, a vdisk, over both of the transport media using the differing protocols (i.e., FCP and iSCSI) simultaneously. In an alternate embodiment, the storage appliance is replaced with a storage appliance cluster, wherein each storage appliance of the cluster exports the data using one of the plurality of protocols.

In a third alternate embodiment, the storage appliance is connected via two or more differing protocols to a client for multi-pathing purposes. In this embodiment, a client may utilize a FC adapter to interconnect with the storage appliance via a FC network and an iSCSI adapter to interconnect via a TCP/IP network to the storage appliance. This alternate embodiment permits administrators to establish multi-pathing capabilities for clients without the need to install and maintain dual FC networks. Additionally, this multi-pathing embodiment permits an easier FCP to iSCSI transition to occur in storage networks by obviating the need to transfer all systems from one protocol to another simultaneoulsy.

BRIEF DESCRIPTION OF THE DRAWINGS

The above and further advantages of invention may be better understood by referring to the following description in conjunction with the accompanying drawings in which like reference numerals indicate identical or functionally similar elements:

FIG. 4E is a schematic block diagram of an exemplary storage network environment utilizing multi-protocol storage appliances in accordance with an embodiment of the present invention;

DETAILED DESCRIPTION OF AN ILLUSTRATIVE EMBODIMENT

A. Multi-Protocol Storage Appliances

The present invention is directed to configuring storage networks having one or more storage appliances that serve both file and block protocol access to information stored on storage devices in an integrated manner. In this context, the term storage appliance denotes a computer having features such as simplicity of storage service management and ease of storage reconfiguration, including reusable storage space, for users (system administrators) and clients of network attached storage (NAS) and storage area network (SAN) deployments. The storage appliance may provide NAS services through a file system, while the same appliance provides SAN services through SAN virtualization, including logical unit number (lun) emulation. The storage appliance also provides access to data via a plurality of block-based protocols simultaneously, such as FCP and iSCSI.

Figure 1:
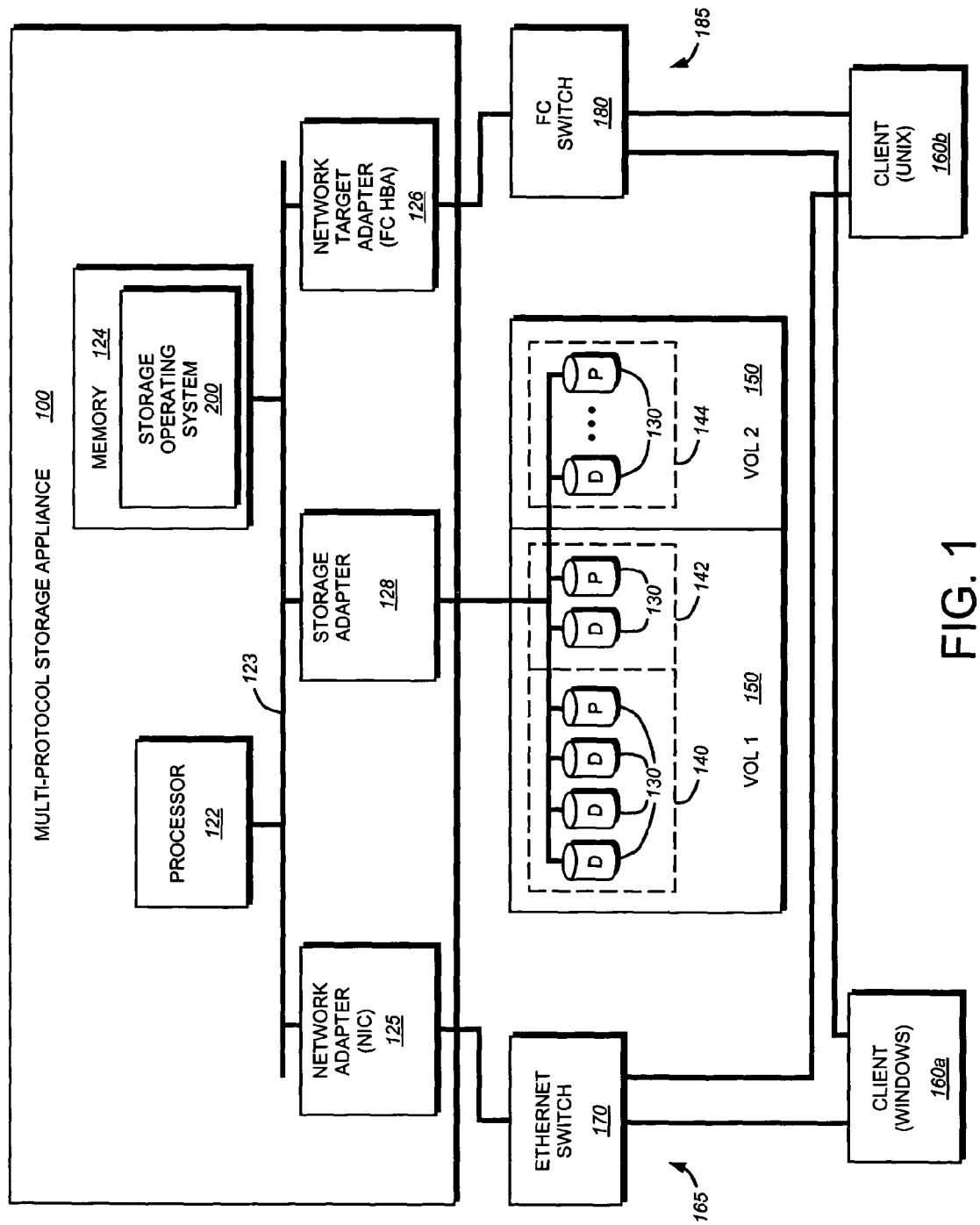
FIG. 1 is a schematic block diagram of a multi-protocol storage appliance configured to operate in storage area network (SAN) and network attached storage (NAS) environments in accordance with the present invention.

FIG. 1 is a schematic block diagram of the storage appliance 100 configured to provide storage service relating to the organization of information on storage devices, such as disks 130. The storage appliance 100 is illustratively embodied as a storage system comprising a processor 122, a memory 124, a plurality of network adapters 125, 126 and a storage adapter 128 interconnected by a system bus 123. The multi-protocol storage appliance 100 also includes a storage operating system 200 that provides a virtualization system (and, in particular, a file system) to logically organize the information as a hierarchical structure of named directory, file and virtual disk (vdisk) storage objects on the disks 130.

Whereas clients of a NAS-based network environment have a storage viewpoint of files, the clients of a SAN-based network environment have a storage viewpoint of blocks or disks. To that end, the multi-protocol storage appliance 100 presents (exports) disks to SAN clients through the creation of luns or vdisk objects. A vdisk object (hereinafter "vdisk") is a special file type that is implemented by the virtualization system and translated into an emulated disk as viewed by the SAN clients. The multi-protocol storage appliance thereafter makes these emulated disks accessible to the SAN clients through controlled exports.

In the illustrative embodiment, the memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 200, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapter 125 couples the storage appliance to a plurality of clients 160*a,b* over point-to-point links, wide area networks, virtual private networks implemented over a public network (Internet) or a shared local area network, hereinafter referred to as an illustrative Ethernet network 165.

Therefore, the network adapter 125 may comprise a network interface card (NIC) having the mechanical, electrical and signaling circuitry needed to connect the appliance to a network switch, such as a conventional Ethernet switch 170. In alternate embodiments, the network adapter 125 may comprise an iSCSI target host bus adapter (HBA) that implements conventional Ethernet MAC, the TCP/IP protocol stack and an iSCSI target layer in hardware. In such embodiments, the storage operating system 200, described further below, utilizes an iSCSI HBA software driver to communicate with the iSCSI HBA.

For NAS-based network environment, the clients are configured to access information stored on the multi-protocol appliance as files. The clients 160 communicate with the storage appliance over network 165 by exchanging discrete frames or packets of data according to pre-defined protocols, such as the Transmission Control Protocol/Internet Protocol (TCP/IP).

The clients 160 may be general-purpose computers configured to execute applications over a variety of operating systems, including the UNIX™ and Microsoft® Windows™ operating systems. Client systems generally utilize file-based access protocols when accessing information (in the form of files and directories) over a NAS-based network. Therefore, each client 160 may request the services of the storage appliance 100 by issuing file access protocol messages (in the form of packets) to the appliance over the network 165. For example, a client 160*a* running the Windows operating system may communicate with the storage appliance 100 using the Common Internet File System (CIFS) protocol over TCP/IP. On the other hand, a client 160*b* running the UNIX operating system may communicate with the multi-protocol appliance using either the Network File System (NFS) protocol over TCP/IP or the Direct Access File System (DAFS) protocol over a virtual interface (VI) transport in accordance with a remote DMA (RDMA) protocol over TCP/IP. Alternately, a client may utilize SCSI encapsulated in TCP/IP (iSCSI) to communicate block-based commands to the storage appliance. A client may utilize an iSCSI HBA to originate iSCSI commands or may, in alternate embodiments, utilize iSCSI initiator software executing in conjunction with the client's conventional TCP/IP protocol stack and Ethernet NIC. Alternately, a client may utilize a TCP/IP offload engine (TOE) that implements TCP/IP in hardware. In a TOE embodiment, the client utilizes iSCSI initiator software to implement an iSCSI initiator module—that interfaces with the TOE to generate iSCSI commands. It will be apparent to those skilled in the art that other clients running other types of operating systems may also communicate with the integrated multi-protocol storage appliance using other file and/or block access protocols. It should also be noted that alternate implementations of iSCSI initiators may be utilized without departing from the scope of the present invention.

The storage network "target" adapter 126 also couples the multi-protocol storage appliance 100 to clients 160 that may be further configured to access the stored information as blocks or disks. For this SAN-based network environment, the storage appliance is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the appliance 100 to a SAN network switch, such as a conventional FC switch 180. In addition to providing FC access, the FC HBA may offload FC network processing operations for the storage appliance.

The clients 160 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks 130, to attach to the storage appliance 100. In SCSI terminology, clients 160 operating in a SAN environment are initiators that initiate requests and commands for data. The multi-protocol storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The multi-protocol storage appliance 100 supports various SCSI-based protocols used in SAN deployments, including SCSI encapsulated over TCP/IP (iSCSI) and SCSI encapsulated over FC (FCP). The initiators (hereinafter clients 160) may thus request the services of the target (hereinafter storage appliance 100) by issuing iSCSI and FCP messages over the network 165, 185 to access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/luns in a heterogeneous SAN environment.

The storage adapter 128 cooperates with the storage operating system 200 executing on the storage appliance to access information requested by the clients. The information may be stored on the disks 130 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the clients.

Storage of information on the appliance 100 is preferably implemented as one or more storage volumes (e.g., VOL1-2 150) that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may used in accordance with the present invention.

Specifically, each volume 150 is constructed from an array of physical disks 130 that are organized as RAID groups 140, 142, and 144. The physical disks of each RAID group include those disks configured to store striped data (D) and those configured to store parity (P) for the data, in accordance with an illustrative RAID 4 level configuration. It should be noted that other RAID level configurations (e.g. RAID 5) are also contemplated for use with the teachings described herein. In the illustrative embodiment, a minimum of one parity disk and one data disk may be employed. However, a typical implementation may include three data and one parity disk per RAID group and at least one RAID group per volume.

To facilitate access to the disks 130, the storage operating system 200 implements a write-anywhere file system of a virtualization system that "virtualizes" the storage space provided by disks 130. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the named files and directories, while further enabling block-based (SAN) access to the named vdisks on a file-based storage platform. The file system simplifies the complexity of management of the underlying physical storage in SAN deployments.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the multi-protocol storage appliance via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data, such as application data, associated with the emulated disk. The stream inode stores attributes that allow luns and exports to persist over, e.g., reboot operations, while also enabling management of the vdisk as a single disk object in relation to SAN clients. An example of a vdisk and its associated inodes that may be advantageously used with the present invention is described in U.S. patent application Ser. No. 10/216,453 published as Publication No. 20040030822A1 and entitled STORAGE VIRTUALIZATION BY LAYERING VDISKS ON A FILE SYSTEM, by Vijayan Rajan, et al., the contents of which are hereby incorporated by reference.

B. Storage Operating System

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any file system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 2:
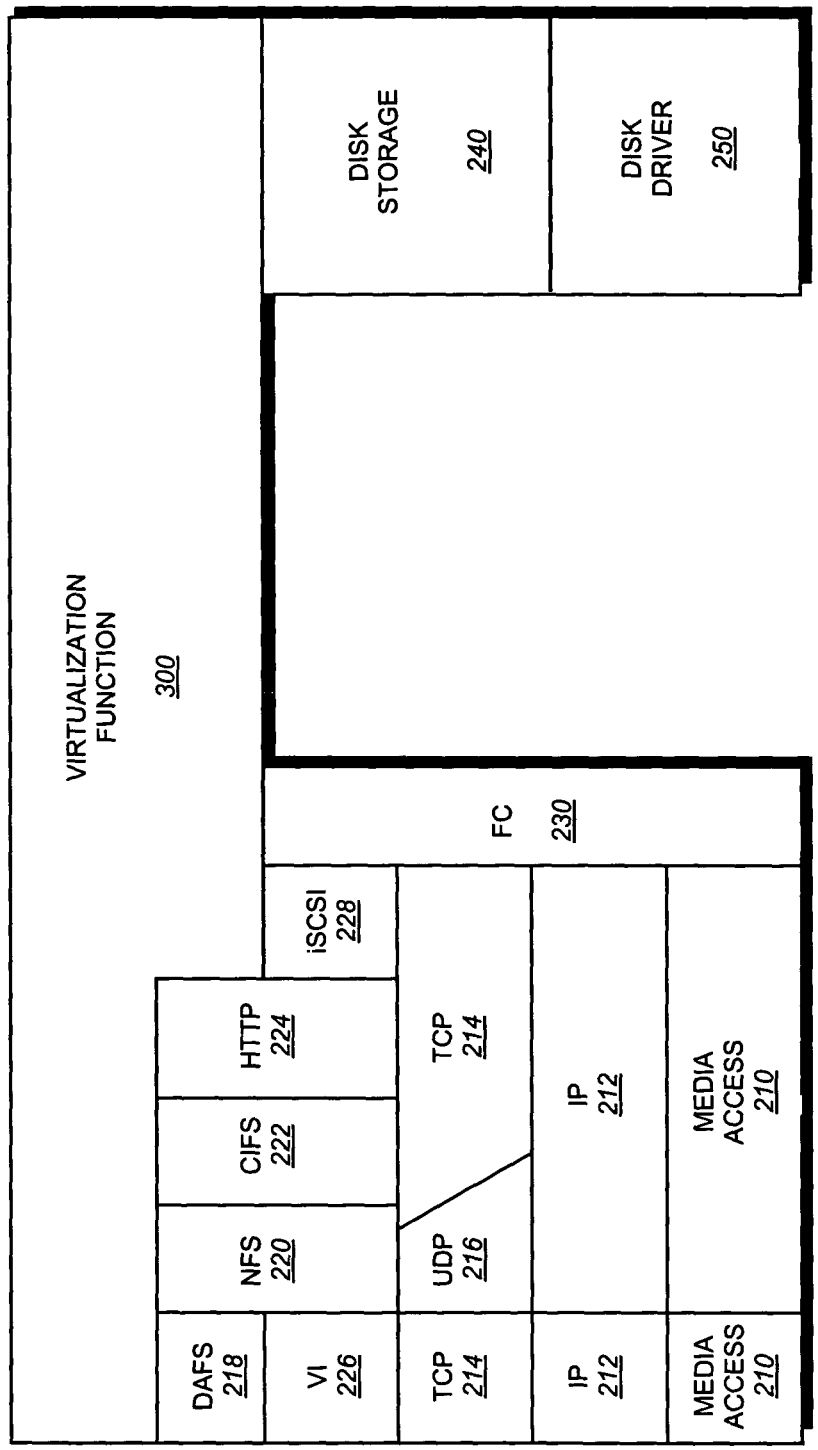
FIG. 2 is a schematic block diagram of a storage operating system of the multi-protocol storage appliance that may be advantageously used with the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 operates with the FC HBA 126 to receive and transmit block access requests and responses to and from the integrated storage appliance. In an alternate embodiment, the storage appliance utilizes a hardware iSCSI HBA. In such embodiments, the iSCSI driver layer 228 communicates directly with the iSCSI HBA and does not interface with the TCP/IP 214, 212 and media access 210 layers of the storage operating system. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 240 that implements a disk storage protocol, such as a RAID protocol, and a disk driver layer 250 that implements a disk access protocol such as, e.g., a SCSI protocol.

Figure 3:
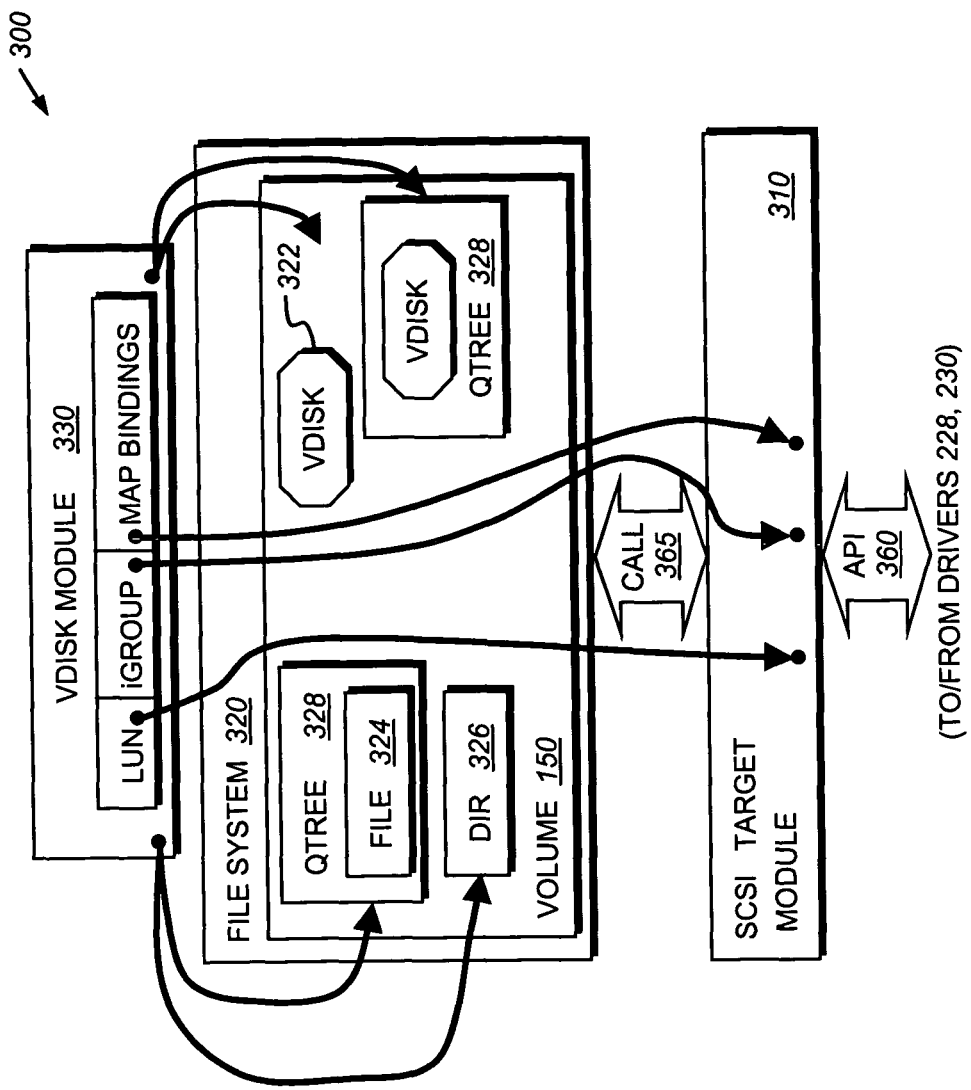
FIG. 3 is a schematic block diagram of an exemplary virtualization system implemented by a file system.

Bridging the disk software layers with the integrated network protocol stack layers is a virtualization system 300 according to the present invention. FIG. 3 is a schematic block diagram of the virtualization system 300 that is implemented by a file system 320 cooperating with virtualization modules illustratively embodied as, e.g., vdisk module 330 and SCSI target module 310. It should be noted that the vdisk module 330, file system 320 and SCSI target module 310 can be implemented in software, hardware, firmware, or a combination thereof. The vdisk module 330 is layered on (and interacts with) the file system 320 to provide a data path from the block-based SCSI target module to blocks managed by the file system.

The SCSI target module 310, in turn, initiates emulation of a disk or lun by providing a mapping procedure that translates logical block access to luns specified in access requests into virtual block access to the special vdisk file types and, for responses to the requests, vdisks into luns. The SCSI target module is illustratively disposed between the FC and iSCSI drivers 228, 230 and the file system 320 to thereby provide a translation layer of the virtualization system 300 between the SAN block (lun) space and the file system space, where luns are represented as vdisks. By "disposing" SAN virtualization over the file system 320, the multi-protocol storage appliance reverses the approaches taken by prior systems to thereby provide a single unified storage platform for essentially all storage access protocols.

The file system provides capabilities for use in file-based access to information stored on the storage devices, such as disks. In addition, the file system provides volume management capabilities for use in block-based access to the stored information. That is, in addition to providing file system semantics (such as differentiation of storage into discrete objects and naming of those storage objects), the file system 320 provides functions normally associated with a volume manager.

The file system 320 illustratively implements the WAFL file system having an on-disk format representation that is block-based using, e.g., 4 kilobyte (kB) blocks and using inodes to describe the files. The WAFL file system uses files to store meta-data describing the layout of its file system; these meta-data files include, among others, an inode file. A file handle, i.e., an identifier that includes an inode number, is used to retrieve an inode from disk. A description of the structure of the file system, including the inode file, is provided in U.S. Pat. No. 5,819,292, titled Method for Maintaining Consistent States of a File System and for Creating User-Accessible Read-Only Copies of a File System by David Hitz et al., issued Oct. 6, 1998, which patent is hereby incorporated by reference as though fully set forth herein.

Broadly stated, all inodes of the file system are organized into the inode file. A file system (FS) info block specifies the layout of information in the file system and includes an inode of a file that includes all other inodes of the file system. Each volume has an FS info block that is preferably stored at a fixed location within, e.g., a RAID group of the file system. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file or vdisk.

Note that the vdisk storage objects in the file system 320 are associated with SAN deployments of the multi-protocol storage appliance, whereas the file and directory storage objects are associated with NAS deployments of the appliance. The files and directories are generally not accessible via the FC or SCSI block access protocols; however, a file can be converted to a vdisk and then accessed by either the SAN or NAS protocol. The vdisks are accessible as luns from the SAN (FC and SCSI) protocols and as files by the NAS (NFS and CIFS) protocols.

C. Configuring Storage Networks

A storage network environment may be advantageously configured to utilize the storage appliance's ability to export a vdisk over two or more block-based protocols simultaneously. As used herein, the term storage network environment denotes a combination of storage appliances, clients and intermediate network nodes, such as switches and/or routers. The storage appliance's export capability permits flexibly in configuration and management of storage environment and may further reduce the total cost of installing/maintaining the storage environment.

Figure 4A:
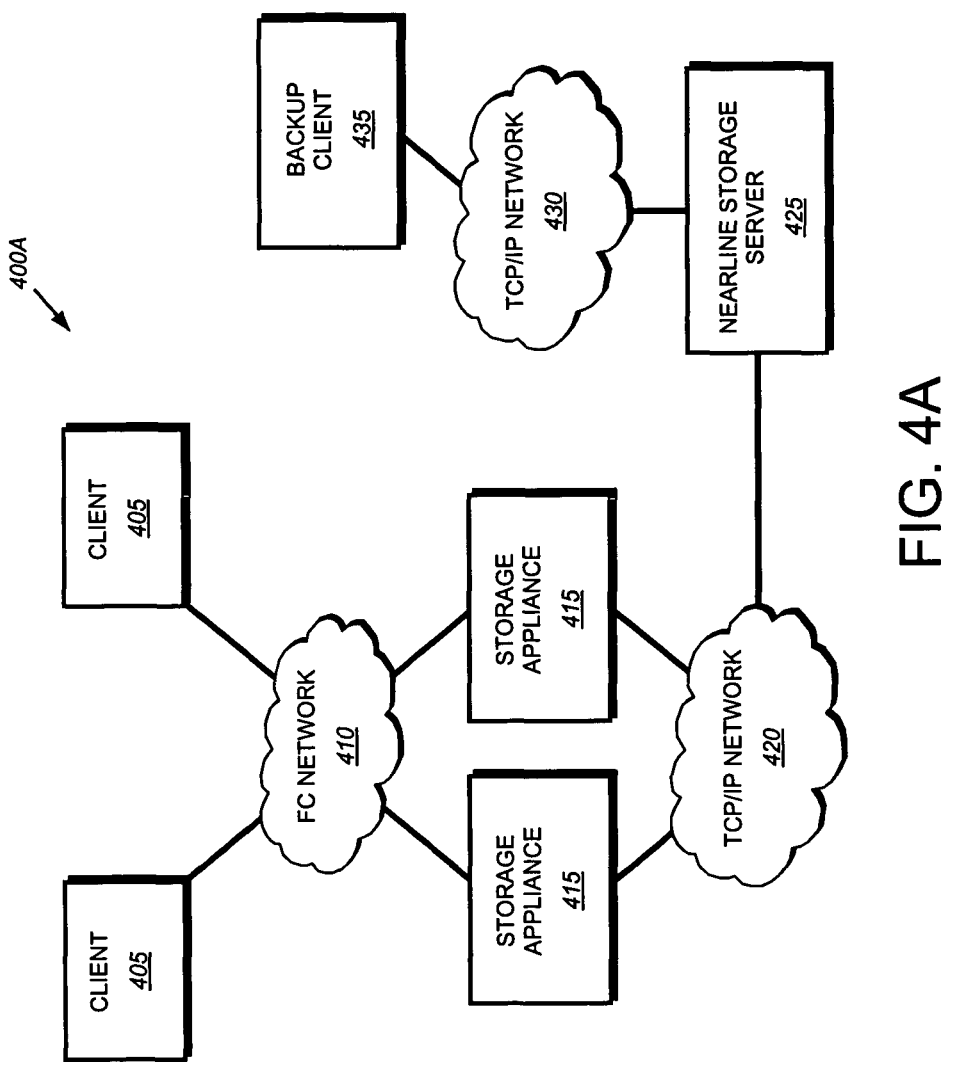
FIG. 4A is a schematic block diagram of an exemplary storage network environment utilizing multi-protocol storage appliances in accordance with an embodiment of the present invention.

FIG. 4A is a schematic block diagram of an exemplary storage network environment 400A utilizing multi-protocol storage appliances in accordance with a first embodiment of the present invention. The environment 400 includes several clients 405 interconnected with a pair of storage appliances 415 via a FC network 410. The storage appliances 415 exporting sets of data (e.g., vdisks) over the FC network for use by the clients 405. Additionally, the storage appliances 415 export the vdisks over a TCP/IP network 420 to a "nearline" storage server 425. The nearline storage server 425 may be used to perform routine backup operations to thereby provide a remote disaster recovery site. The TCP/IP network 420 may be geographically diverse from the FC network 410. For example, the storage appliances 415 may utilize existing TCP/IP networks 420 including, for example, the well-known Internet, to transport information, such as data from the nearline storage server 425. The use of existing TCP/IP networks reduces the cost of installing such a nearline storage server. The storage environment 400 also includes a second TCP/IP network 430 interfacing between the nearline server 425 and a backup client 435. Thus, the nearline storage server may provide redundant data access over a second heterogeneous protocol network, i.e., the TCP/IP network 430, to backup application server 435.

The environment 400A of FIG. 4A exemplifies one technique for configuring a storage environment for a storage network utilizing multi-protocol storage appliances to take advantage of the storage appliances capability to export data via a plurality of block-based protocols simultaneously. In the exemplary network 400, the most heavily utilized network, i.e., the FC network 410, is comprised of high-speed FC, whereas lesser utilized networks, including the two TCP/IP networks 420 and 430, utilize less expensive Ethernet cabling and hardware. Such a configuration reduces the total cost of establishing and/or maintaining storage system environments. More generally, the first embodiment utilizes a multi-protocol storage appliance to export data over a first block-based protocol while simultaneously exporting the same data over a second block-based protocol. In a typical configuration, the first block-based protocol is a high-speed protocol that is utilized by clients of the storage appliance to access data. The second block-based protocol is primarily utilized for backup or data redundancy functionality and may not provide data access that is as fast as the first block-based protocol.

A number of techniques may be utilized to transfer data from storage appliances 415 to the nearline storage server 425. One example is the use of a mirroring technique, such as that described in U.S. patent application Ser. No. 10/100,967, entitled SYSTEM AND METHOD FOR DETERMINING CHANGES IN TWO SNAPSHOTS AND FOR TRANSMITTING CHANGES TO A DESTINATION SNAPSHOT, by Michael L. Federwisch, et al. Another technique would be for the storage appliance 415 to send iSCSI write operations directly to the nearline storage server. In such an implementation, the storage appliance would require appropriate modification to include an iSCSI initiator. In such an implementation, the nearline storage server may be replaced with offline storage server, such as a SCSI tape device for back up operations. In a third implementation, the nearline storage server is configured as an iSCSI initiator to send iSCSI read requests tot he storage appliance 415 to read the data to be transferred. It should be noted that in alternate embodiments, other techniques may be utilized in transferring data from storage appliances 415 to the nearline storage server 425.

Figure 4B:
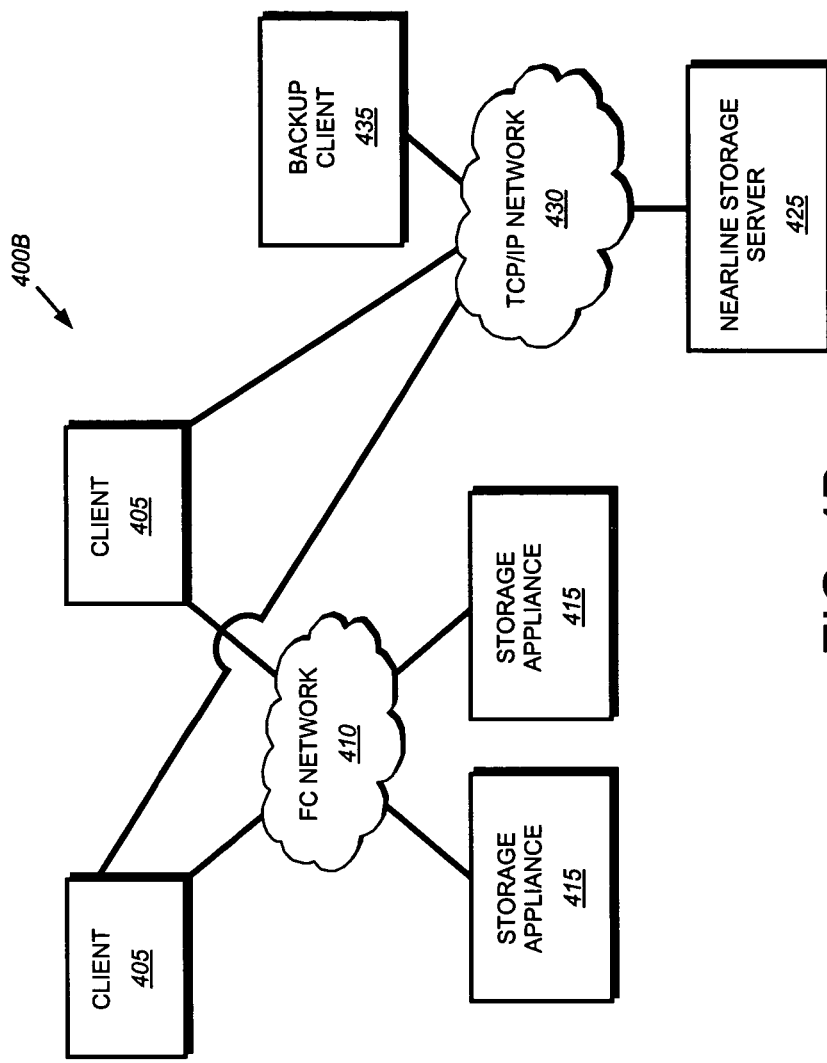
FIG. 4B is a schematic block diagram of an exemplary storage network environment utilizing multi-protocol storage appliances in accordance with an embodiment of the present invention.

FIG. 4B is a schematic block diagram of an exemplary storage network environment 400B utilizing multi-protocol storage appliances in accordance with a first embodiment of the present invention. In this illustrative figure, the clients 405 include an iSCSI initiator to enable the clients to directly copy the backup data to the nearline storage server 425. In such a configuration, clients may utilize host side block level mirroring software, where each data write operation is sent to both the storage appliance 415 and to the nearline storage server 425. Alternately, the client 405 may perform a periodic block level dump operation from the storage appliance to the nearline storage server 425. In this configuration, the client 405 reads the data via FCP over network 410 and writes it via iSCSI over network 430.

Figure 4C:
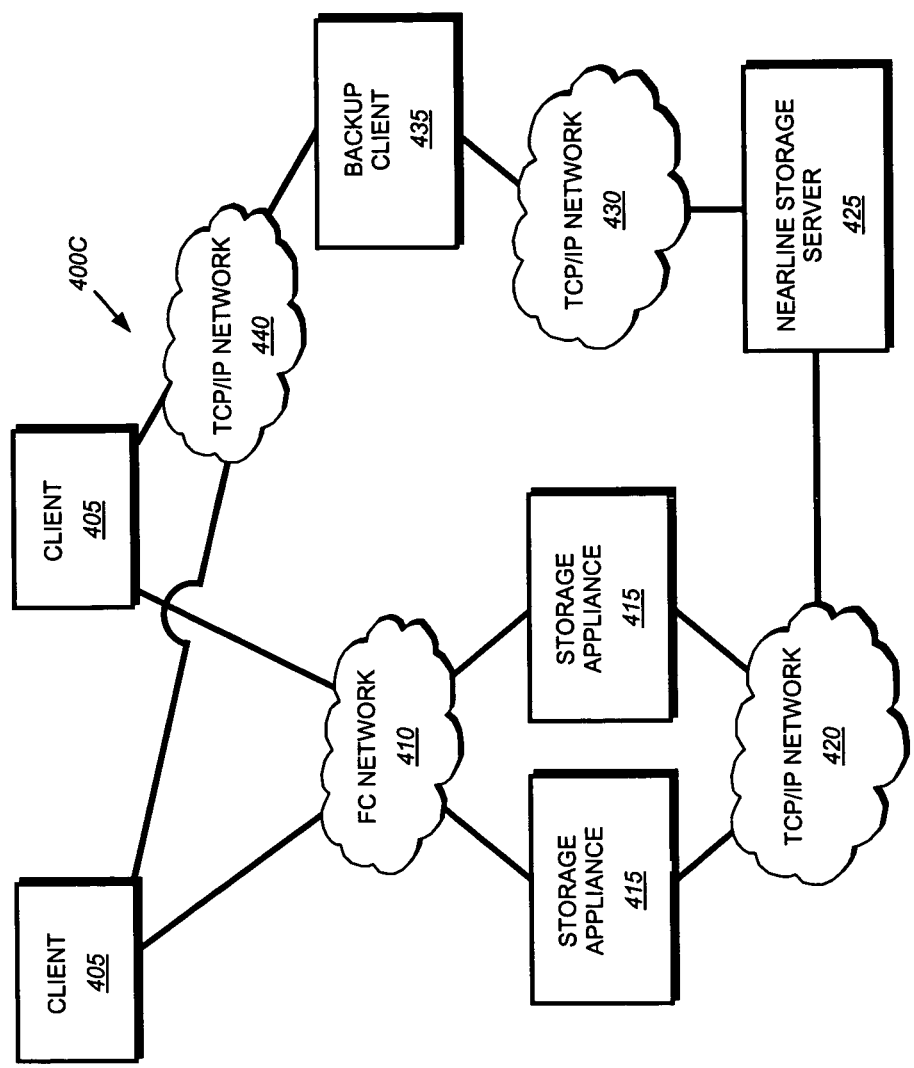
FIG. 4C is a schematic block diagram of an exemplary storage network environment utilizing multi-protocol storage appliances in accordance with an embodiment of the present invention.

FIG. 4C a schematic block diagram of an exemplary storage network environment 400C utilizing multi-protocol storage appliances in accordance with a first embodiment of the present invention. In this configuration, the backup client 405 is configured to write the data to the nearline storage server 425. In one embodiment, there is a TCP/IP network 440 between clients 405 and the backup client 435 over which the data is transferred. In such a configuration, data may be transferred using a host-to-host block level replication solution, such as the Veritas Volume Replicator (VVR), available from Veritas Software Corporation of Mountain View, Calif. When a client 405 writes data using FCP to the storage appliances 415 it also sends the blocks written using VVR to the backup client 435, which then writes the blocks to the nearline storage server 425 using iSCSI. Alternately, the client 405 may utilize a conventional Ethernet-base backup mechanism that reads data using FCP from storage appliances 415 and transmits the data to the backup client 435 using an backup protocol. The backup client 435 then writes the data to the nearline storage server 435 via iSCSI.

Figure 4D:
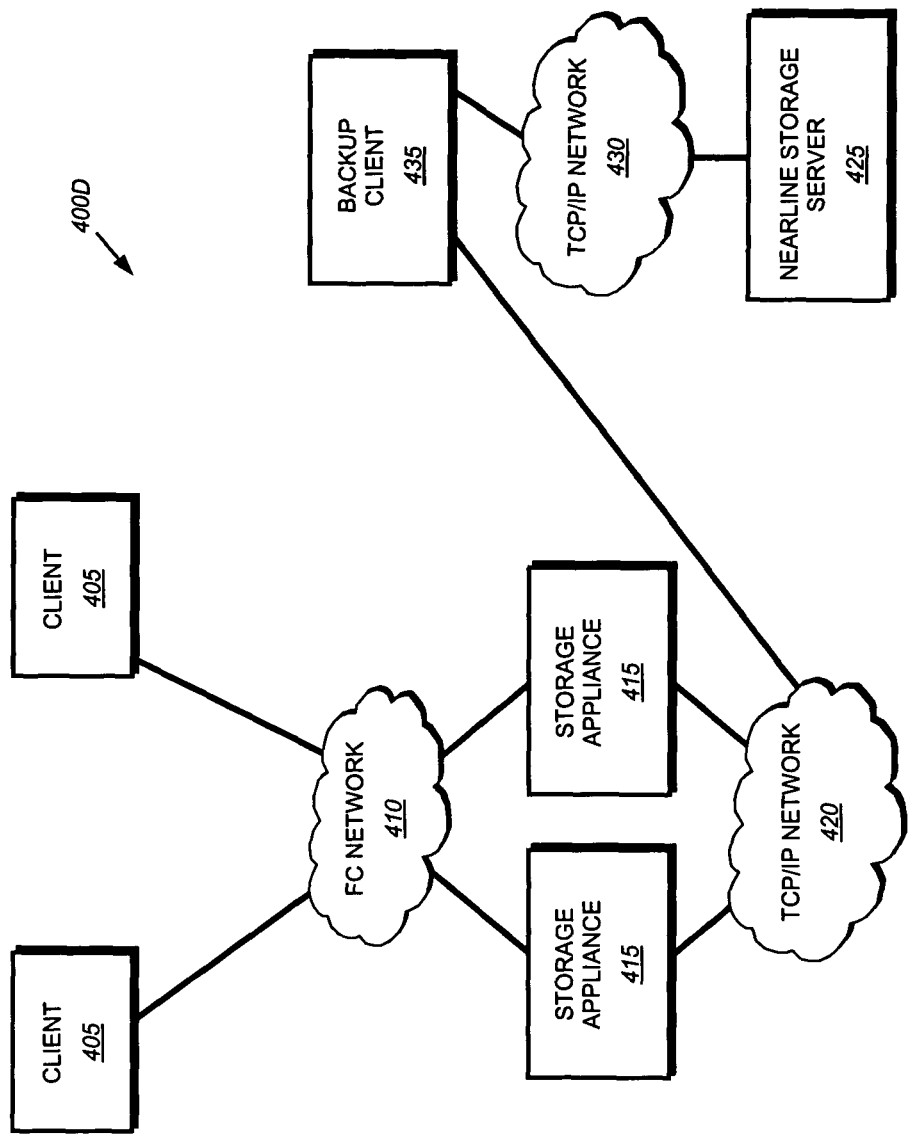
FIG. 4D is a schematic block diagram of an exemplary storage network environment utilizing multi-protocol storage appliances in accordance with an embodiment of the present invention.

FIG. 4D is a schematic block diagram of an exemplary storage network environment 400D utilizing multi-protocol storage appliances in accordance with a first embodiment of the present invention. In this configuration, the backup client 435 includes a block-level protocol access to the storage appliances 415. In this example, the connection is via iSCSI over the TCP/IP network 420. The backup client reads data from storage appliance 415 and write the data using, in the illustrative embodiment, iSCSI over the TCP/IP network 430 to the nearline storage server 425. FIG. 4E is similar to FIG. 4D, however, in the configuration of FIG. 4E, the TCP/IP network 420 between storage appliance 415 and the backup client is replaced with a FC network 422. Thus, in the configuration 400E shown in FIG. 4E, the backup client reads data from the storage appliance using, e.g., FCP over the FC network 422 and writes the data to the nearline storage server 425 using iSCSI over the TCP/IP network 430. It should be noted that in alternate embodiments, network 410 may be the same as network 422.

Figure 5:
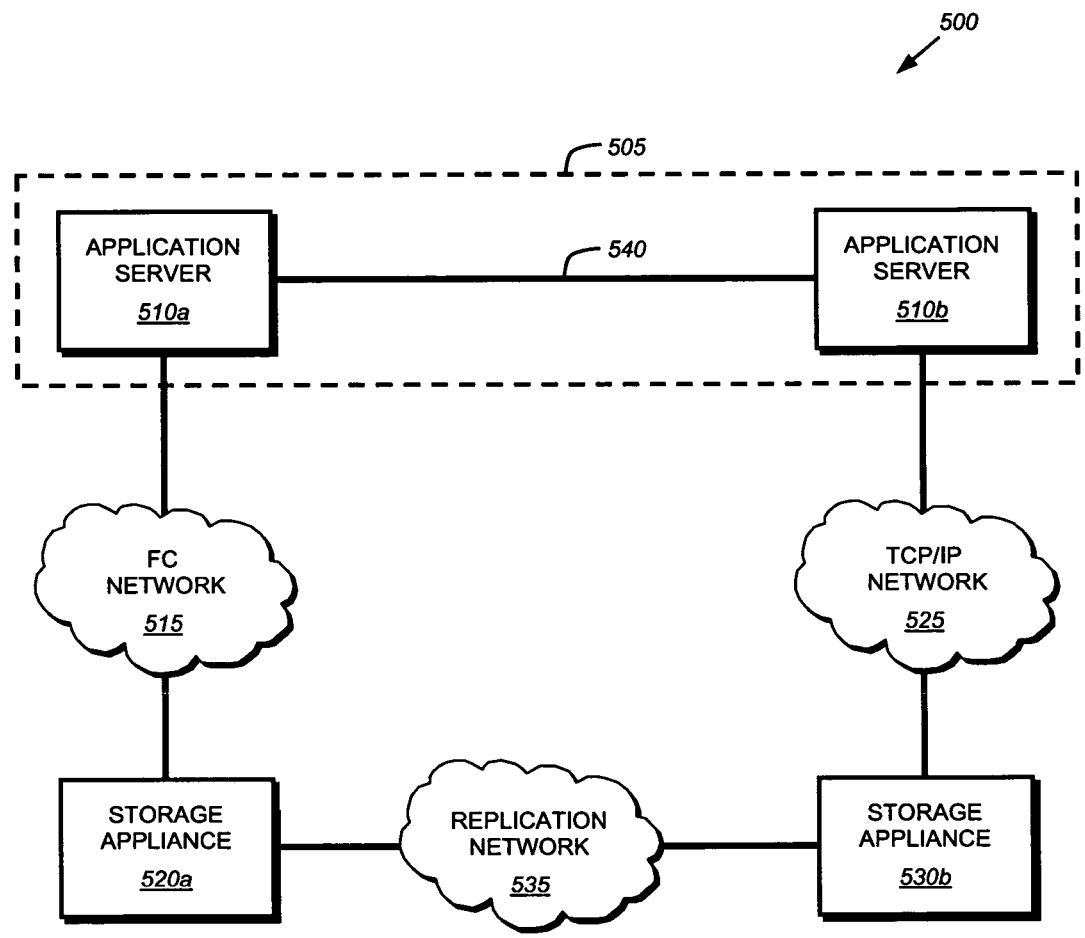
FIG. 5 is a schematic block diagram of an exemplary storage network environment including server in accordance with the embodiment of the present invention.

FIG. 5 is a schematic block diagram of an exemplary storage network environment 500 for use with multi-protocol storage appliances in accordance with a second embodiment of the present invention. The environment 500 centers around an application server cluster 505 including a plurality of application servers 510a, b. The first application server 510a is interconnected with a storage appliance 520a via a FC network 515, whereas, application server 510b is connected to storage appliance 530b via a TCP/IP network 525. The storage appliances 520a, b are interconnected by a replication network 535, which may be a TCP/IP network or any other acceptable networking protocol. The application servers 510a, b are interconnected by a cluster interconnect 540 that may comprise any acceptable networking medium.

The application servers 510 of the cluster 505 operate such that application server 510a typically handles the processing of application requests from clients (not shown) of the cluster 505. However, should application server 510a fail or otherwise suffer an error condition, then application server 510b assumes processing of client requests. Since the "backup" application server 510b is not typically utilized, the use of slower TCP/IP 525 network for interconnecting the application server 510b to storage appliance 530b reduces the cost of implementing the cluster by eliminating the need for dual FC networks. Each of the storage appliances 520a, b is capable of storage service and, thus of exporting data, such as a vdisk, via a plurality of block-access protocols, an administrator may utilize heterogeneous networks to reduce the total cost of implementing such a storage network environment.

In alternate embodiments, storage appliances 520a, b and replication network 530 may be replaced by a single storage appliance opeatively interconnected with both the FC network 515 and the TCP/IP network 525. Such a configuration permits the storage appliance to export vdisks via both FCP and iSCSI protocols simultaneously; however, such a single storage appliance configuration introduces a single point of failure into the storage network environment. Additionally, in alternate embodiments, storage appliances 520a, b may be integrated into a storage appliance cluster configured such that when one storage appliance fails, the other storage appliance assumes its identity and continues processing data access requests. The use of storage appliances in a cluster configuration provides additional redundancies to prevent either loss of data or loss of connectivity to data by clients of the storage network environment.

Figure 6:
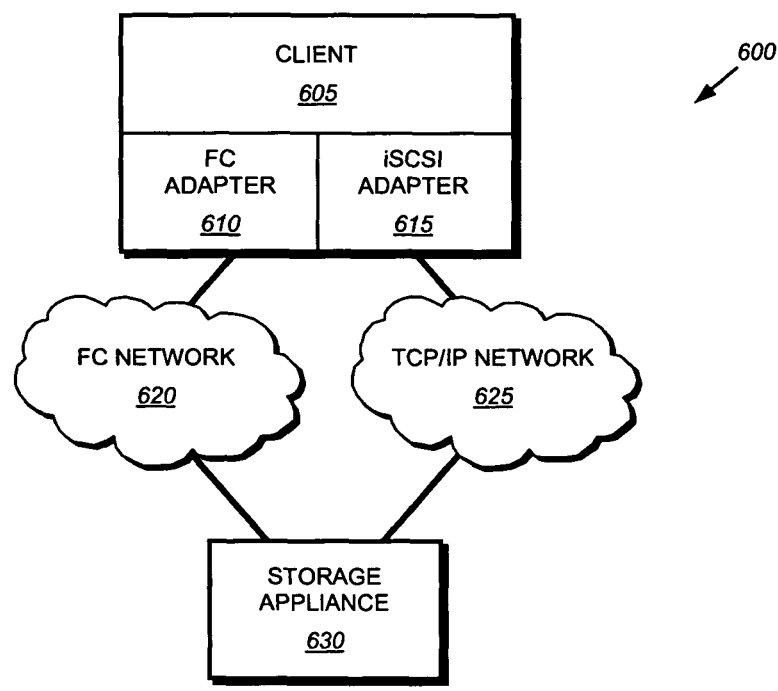
FIG. 6 is a schematic block diagram of an exemplary multi-pathing environment in accordance with an embodiment of the parent invention.

FIG. 6 is a schematic block diagram of an exemplary multi-pathed storage network environment 600 in a third embodiment showing multi-pathing utilizing differing transport protocols in accordance with a third embodiment of the present invention. The storage network environment 605 includes a client 605 of a storage appliance 630. The storage appliance is interconnected with both an FC network 620 and a TCP/IP network 625 and, in the illustrative embodiment, exports data via both FCP and iSCSI. The client 605 includes both a FC adapter 610 and an iSCSI adapter 615. The client is configured with conventional multi-pathing software utilizes both connections to the data and the storage appliance over, e.g., the FC network 620 and TCP/IP network 625.

The multi-pathing network configuration 600 may be useful in a variety of circumstances. For example, by utilizing an alternate data path be a low-cost TCP/IP network, system administrators may reduce the total cost of installing redundant data paths to provide backup and safety measures. Alternately, should administrators desire to transfer an installation from FCP to iSCSI, or vice versa, the configuration may be utilized as an intermediate step as the new network is tested. For example, an administrator may move from having an all FC network to an all TCP/IP network by first installing a single TCP/IP network 625 attached to an iSCSI adapter 615 of client 605 and the storage appliance 630. Using multi-pathing software on the client, the TCP/IP network may be tested while maintaining a stable "backup" FC network 620 for access to the appliance 630.

To again summarize, the present invention is directed to a system and method for configuring one or more multi-protocol storage appliances that support exporting data using a plurality of block-based protocols simultaneously. In a first embodiment, clients of a storage system network interconnect using a first transport medium or protocol, such as FC. The storage appliance exports the same data over both the FC network to clients and also over a TCP/IP network to a nearline storage server configured as a backup data repository. In a second embodiment, a plurality of application servers, arranged in a cluster configuration utilize differing protocols to communicate with the storage appliances. In this second embodiment, a first application server utilizes the FC protocol to communicate with the storage appliance while a second client, which may be the standby server of the cluster, utilizes a lower cost TCP/IP connection to the storage appliance. In a third embodiment, a single client utilizes two or more protocols to connect to a storage appliance simultaneously. Such a multi-pathing configuration may include the use of a FC adapter connecting to the storage appliance via a FC network and an iSCSI adapter connecting to storage appliance via a TCP/IP network.

More generally, the present invention is directed to a technique for utilizing the ability of a multi-protocol storage appliance to export data using two or more block-based protocols simultaneously. Specifically, by utilizing FC (and FCP) as a primary and TCP/IP (and iSCSI) as a secondary data path (and protocol), a storage network may achieve the high speed benefits of a FC network while achieving a cost savings associated with TCP/IP networks.

The foregoing description has been directed to specific embodiments of this invention. It will be apparent, however, that other variations and modifications may be made to the described embodiments, with the attainment of some or all of their advantages. For example, it is expressly contemplated that the teachings of this invention can be implemented as software, including a computer-readable medium having program instructions executing on a computer, hardware, firmware, or a combination thereof. Additionally, while this description has been written in terms of the FCP and iSCSI protocols, it is expressly contemplated that other protocols may be utilized in accordance with the principles of the present invention. Accordingly this description is to be taken only by way of example and not to otherwise limit the scope of the invention. It is thus the object of the appended claims to cover all such variations and modifications as come within the true spirit and scope of the invention.

What is claimed is:

1. A method comprising:
    simultaneously presenting, by a storage appliance, data over both a first network using a first block-based storage access protocol and over a second network using a second block-based storage access protocol, the first network coupling the storage appliance to one or more clients and the second network coupling the storage appliance to a storage server;
    receiving from a client, a first request message at the storage appliance to write selected data;
    in response to receiving the first request message to write the selected data,
        (i) executing the first request message to write the selected data at the storage appliance over the first network utilizing the first block-based storage access protocol, and
        (ii) executing the first request message to write the selected data at the storage server, where the first request message is sent from the client to a backup client utilizing a host-to-host block level replication solution and the backup client utilizing the second block-based storage access protocol to execute the first request message to write the selected data at the storage server over the second network.

2. The method as in claim 1, wherein the first block-based storage access protocol comprises a Fibre Channel Protocol.

3. The method as in claim 2, wherein the second block-based storage access protocol comprises an Internet Small Computer System Interface Protocol.

4. The method as in claim 2, wherein the second block-based storage access protocol comprises a Transmission Control Protocol/Internet Protocol.

5. The method as in claim 1, wherein simultaneously presenting comprises:
    presenting the data in a form of one or more virtual disks.

6. The method as in claim 1, further comprising:
    transmitting the data by the storage appliance over the second network to the storage server.

7. The method as in claim 6, further comprising:
    configuring the storage server to provide routine backup operations.

8. The method as in claim 6, further comprising:
    configuring the storage server to provide file based storage services.

9. The method as in claim 6, further comprising:
    configuring the storage server to provide block-based storage services.

10. The method as in claim 1, further comprising:
    receiving, from the client, the first request message as a block-based storage access request.

11. The method as in claim 1, wherein the first network is a fibre channel network and the second network is an Ethernet network.

12. A system, comprising:
    a storage system configured to present data simultaneously over both a first network using a first block-based storage access protocol and over a second network using a second block-based storage access protocol, the storage system coupled to one or more clients over the first network and the storage system coupled to a storage server over the second network, the storage system comprising:
        a first adapter configured to receive a first request message from a client to write selected data;
        a processor configured to
            execute the first request message to write the selected data at the storage system over the first network utilizing the first block-based storage access protocol, where the first request message is also sent from the client to a backup client utilizing a host-to-host block level replication solution and the backup client utilizes the second block-based storage access protocol to also execute the first request message to write the selected data at the storage server.

13. The data storage system as in claim 12, wherein the first block-based storage access protocol comprises a Fibre Channel Protocol.

14. The data storage system as in claim 13, wherein the second block-based storage access protocol comprises an Internet Small Computer System Interface Protocol.

15. The data storage system as in claim 13, wherein the second block-based storage access protocol comprises a Transmission Control Protocol/Internet Protocol.

16. The data storage system as in claim 12, wherein the storage system presents the data simultaneously in a form of one or more virtual disk.

17. The data storage system as in claim 12, further comprising:
    the storage server configured to provide block-based storage services.

18. The data storage system as in claim 12, wherein the first network is a fibre channel network and the second network is a Ethernet network.

19. A computer readable medium containing executable program instructions executed by a processor, comprising:

program instructions that simultaneously present data, for a storage appliance, over both a first network using a first block-based storage access protocol and a second network using a second block-based storage access protocol, where the storage appliance is coupled to one or more clients over the first network and the storage appliance is coupled to a storage server over the second network;

program instructions that receive, from a client at an adapter of the storage appliance, a write request message to write selected data;

program instructions that execute the write request message to write the selected data at the storage appliance over the first network utilizing the first block-based storage access protocol in response to receiving the write request message; and program instructions that send the write request message from the client to a backup client utilizing a host-to-host block level replication solution and the backup client utilizing the second block-based storage access protocol to also execute the write request message to write the selected data at the storage server.

20. The method as in claim 1, wherein the client utilizes a Ethernet-based backup mechanism to read data from the storage appliance utilizing a Fibre Channel Protocol and the backup client receives the data from the client and writes the data to the storage server via Internet Small Computer System Interface.

* * * * *

UNITED STATES PATENT AND TRADEMARK OFFICE
CERTIFICATE OF CORRECTION

PATENT NO. : 8,996,455 B2  
APPLICATION NO. : 10/835987  
DATED : March 31, 2015  
INVENTOR(S) : Arthur F. Lent Page 1 of 1

It is certified that error appears in the above-identified patent and that said Letters Patent is hereby corrected as shown below:

In the Specification:  
Col. 5, line 22 should read:  
systems, including the UNIX ® and Microsoft® Windows™

In the Claims:  
Claim 5, Col. 14, line 6 should read:  
presenting the data in the form of one or more virtual disks.

Claim 10, Col. 14, line 20 should read:  
receiving, from a client, the first request message as a Claim 16, Col. 14, line 57 should read:  
storage system presents the data simultaneously in the form of Signed and Sealed this  
Twenty-eighth Day of July, 2015

Michelle K. Lee  
*Director of the United States Patent and Trademark Office*